(12) United States Patent
Hansson et al.

(10) Patent No.: US 11,803,228 B2
(45) Date of Patent: Oct. 31, 2023

(54) MULTIPLE HETEROGENEOUS ENERGY STORES

(71) Applicant: ARM LIMITED, Cambridge (GB)

(72) Inventors: Andreas Hansson, Cambridge (GB); Ashley John Crawford, Ashdon (GB); Stephan Diestelhorst, Cambridge (GB); James Edward Myers, Bottisham (GB)

(73) Assignee: Arm Limited, Cambridge (GB)

( * ) Notice: Subject to any disclaimer, the term of this patent is extended or adjusted under 35 U.S.C. 154(b) by 580 days.

(21) Appl. No.: 15/566,386

(22) PCT Filed: Mar. 10, 2016

(86) PCT No.: PCT/GB2016/050646
§ 371 (c)(1),
(2) Date: Oct. 13, 2017

(87) PCT Pub. No.: WO2016/166503
PCT Pub. Date: Oct. 20, 2016

(65) Prior Publication Data
US 2018/0143679 A1 May 24, 2018

(30) Foreign Application Priority Data
Apr. 16, 2015 (GB) ..................................... 1506492

(51) Int. Cl.
*G06F 1/26* (2006.01)
*G06F 1/329* (2019.01)
(Continued)

(52) U.S. Cl.
CPC .............. *G06F 1/329* (2013.01); *G06F 1/263* (2013.01); *G06F 1/3228* (2013.01); *H02J 7/345* (2013.01);
(Continued)

(58) Field of Classification Search
CPC ....................................................... G06F 1/329
See application file for complete search history.

(56) References Cited

U.S. PATENT DOCUMENTS 5,964,879 A * 10/1999 Dunstan ................ G06F 1/3215
713/320
6,268,764 B1 * 7/2001 Eagar ........................ G05F 3/30
327/143
(Continued)

FOREIGN PATENT DOCUMENTS

EP 2 590 050 5/2013

OTHER PUBLICATIONS

International Search Report and Written Opinion of the ISA for PCT/GB2016/050646, dated May 19, 2016, 14 pages.
(Continued)

*Primary Examiner* — Paul Yen
(74) *Attorney, Agent, or Firm* — NIXON & VANDERHYE P.C.

(57) ABSTRACT

There is provided an apparatus comprising a requirement determination unit to determine an energy requirement for a system component. A status determination unit determines status information relating to a plurality of heterogeneous energy stores and actuating system control unit controls an activity of the system component in dependence on the status information relating to the plurality of heterogeneous energy stores and the energy requirement.

28 Claims, 6 Drawing Sheets

(51) Int. Cl.
*H02J 7/34* (2006.01)
*G06F 1/3228* (2019.01)
*H02J 7/00* (2006.01)

(52) U.S. Cl.
CPC ..... *H02J 7/00714* (2020.01); *H02J 7/007182* (2020.01); *H02J 7/007192* (2020.01); *Y02D 10/00* (2018.01)

(56) References Cited

U.S. PATENT DOCUMENTS

| | | | | |
|---|---|---|---|---|
| 6,998,822 | B2* | 2/2006 | Turner | H02J 7/345 320/166 |
| 7,555,666 | B2* | 6/2009 | Brundridge | G06F 1/3203 713/300 |
| 7,886,173 | B2* | 2/2011 | Krieger | H02J 9/061 713/330 |
| 2008/0024007 | A1 | 1/2008 | Budampati et al. | |
| 2008/0306637 | A1* | 12/2008 | Borumand | H02J 1/14 701/3 |
| 2010/0257529 | A1 | 10/2010 | Wilkerson et al. | |
| 2011/0271126 | A1* | 11/2011 | Hill | G06F 1/3203 713/320 |
| 2013/0346762 | A1 | 12/2013 | Hodges et al. | |
| 2014/0181547 | A1 | 6/2014 | Hua | |
| 2015/0149799 | A1 | 5/2015 | Ye et al. | |

OTHER PUBLICATIONS

Search Report for GB 1506492.6, dated Oct. 6, 2015, 3 pages.
Andrew C. Baisden et al., "ADVISOR-Based Model of a Battery and an Ultra-Capacitor Energy Source for Hybrid Electric Vehicles", IEEE Transactions On Vehicular Technology, vol. 53, No. 1, Jan. 2004, pp. 199-205.
Chen Chen et al., "Design and realization of a smart battery management system", Proceedings of the International MultiConference of Engineers and Computer Scientists 2012, vol. II, IMECS 2012, Mar. 14-16, 2012, 5 pages.
Jason Flinn, "Extending Mobile Computer Battery Life through Energy-Aware Adaptation", School of Computer Science Computer Science Department, Carnegie Mellon University, Pittsburgh, PA, Dec. 2001, 165 pages.
Minyong Kim et al., "Measuring Variance between Smartphone Energy Consumption and Battery Life", IEEE, Jul. 2014, pp. 59-65.
Jian Li et al., "Paper-based ultracapacitors with carbon nanotubes-graphene composites", Journal of Applied Physics, published online Apr. 22, 2014, vol. 115, pp. 164301-1-164301-5.
Nishkam Ravi et al., "Context-aware Battery Management for Mobile Phones: A Feasibility Study", 2008 Sixth Annual IEEE International Conference on Pervasive Computing and Communications (PerCom), Mar. 17-21, 2008, 16 pages.
Peng Rong et al., "Battery-Aware Power Management Based on Markovian Decision Processes", Dept. of EE-Systems, University of Southern California, Nov. 13, 2002, 10 pages.
Narseo Vallina-Rodriguez et al., "Energy Management Techniques in Modern Mobile Handsets", IEEE Communications Surveys & Tutorials, Feb. 24, 2012, 20 pages.
Changle Xiang et al., "A New Topology and Control Strategy for a Hybrid Battery-Ultracapacitor Energy Storage System", *Energies* 2014, 7, pp. 2874-2896.
Lide Zhang et al., "Accurate Online Power Estimation and Automatic Battery Behavior Based Power Model Generation for Smartphones", CODES+ISSS'10, Oct. 24-29, 2010, 10 pages.
Examination Report for GB Application No. 1506492.6 dated Jan. 31, 2020, 5 pages.
Examination Report for GB Application 1506492.6 dated May 19, 2020, 4 pages.
Office Action for GB Application No. 1506492.6 dated Sep. 15, 2020, 4 pages.

* cited by examiner

MULTIPLE HETEROGENEOUS ENERGY STORES

This application is the U.S. national phase of International Application No. PCT/GB2016/050646 filed 10 Mar. 2016, which designated the U.S. and claims priority to GB Patent Application No. 1506492.6 filed 16 Apr. 2015, the entire contents of each of which are hereby incorporated by reference.

TECHNICAL FIELD

The present technique relates to the field of heterogeneous energy stores.

BACKGROUND

Different energy stores may have different energy characteristics.

SUMMARY

Viewed from a first example configuration, there is provided an apparatus comprising: a requirement determination unit to determine an energy requirement for a system component; a status determination unit to determine status information relating to a plurality of heterogeneous energy stores; and a system control unit to control an activity of the system component in dependence on the status information relating to the plurality of heterogeneous energy stores and the energy requirement.

Viewed from a second example configuration there is provided a method comprising the steps: determining an energy requirement for a system component; determining status information relating to a plurality of heterogeneous energy stores; and controlling an activity of the system component in dependence on the status information relating to the plurality of heterogeneous energy stores and the energy requirement.

Viewed from a third example configuration there is provided an apparatus comprising: requirement determination means for determining an energy requirement for a system component; status determination means for determining status information relating to a plurality of heterogeneous energy stores; and system control means for controlling an activity of the system component in dependence on the status information relating to the plurality of heterogeneous energy stores and the energy requirement.

BRIEF DESCRIPTION OF FIGURES

The present technique will be described further, by way of example only, with reference to embodiments thereof as illustrated in the accompanying drawings, in which.

DETAILED DESCRIPTION

Figure 1:
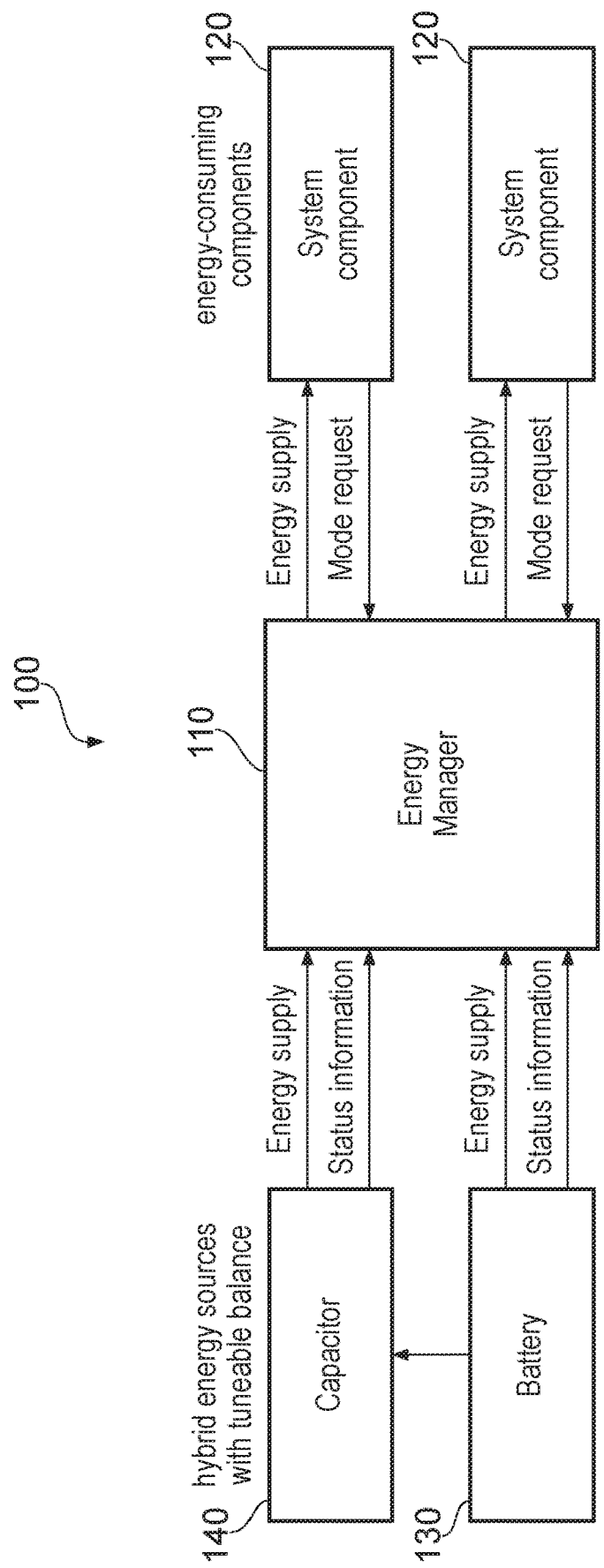
FIG. 1 is a diagram illustrating, schematically, an energy manager in accordance with one embodiment.

Before discussing the embodiments with reference to the accompanying figures, the following description of embodiments and associated advantages is provided.

In accordance with one example configuration there is provided an apparatus comprising: a requirement determination unit to determine an energy requirement for a system component; a status determination unit to determine status information relating to a plurality of heterogeneous energy stores; and a system control unit to control an activity of the system component in dependence on the status information relating to the plurality of heterogeneous energy stores and the energy requirement.

The inventors have realised that when a plurality of heterogeneous energy stores (e.g. a plurality of energy stores in which at least two of the energy stores have different properties) are provided, it may be desirable to control the activities of system components that acquire energy from those energy stores in dependence on status information relating to the energy stores together with an energy requirement for the system component. Accordingly, based on both the status information relating to the plurality of heterogeneous energy stores and the energy requirement for a particular system component, the system control unit may cause the system component to act in a particular way. Using such a system, it is possible to be more flexible in how energy is used and allocated. This may be in contrast to other systems whereby the activities of the system components dictate the provision of energy from the energy stores in order to accomplish a particular task. This goes beyond just selecting the source that best suits the required activity. Instead, the activity of the system component is modified to make better use of the energy resource. The energy requirement may be a requested energy requirement. In some cases, the energy requirement may be an anticipated, expected, or future energy requirement. The energy requirement may also (or alternatively) be a current energy requirement. The energy requirement may also (or alternatively) be a previous energy requirement.

In some embodiments, the apparatus further comprises: a request receiving unit to receive a request from the system component; and the requirement determination unit is capable of determining the energy requirement for the system component based on the request. Accordingly, the requirement determination unit itself determines the energy requirement for the system component based on the request received from that system component.

Such a request, may, for example, comprise a desired energy amount from the system component. This may reduce the number of calculations that must be performed by the requirement determination unit. In particular, there may be no need for the requirement determination unit to calculate the energy required for one of the system components to perform a particular activity. Instead, the system component may directly request the amount of energy required.

The system component may be capable of operating at a plurality of modes, at least one mode having greater energy requirement than another; and the request may be indicative of a desired one of the plurality of modes. There may be little or no need for the system component itself to have any knowledge of the energy required in each of its modes. Instead, the requirement determination unit may determine the energy requirement for a particular mode. In other embodiments, the request may comprise a desired activity to be performed and, again, the necessary energy may be determined by the requirement determination unit itself.

There are a number of ways in which a requirement determination unit may determine the energy requirement for the system component. However, in some embodiments, this is achieved based on historical energy consumption of the system component. By determining energy requirement for a system component based on the historical energy consumption of that system component, it may be possible to take into account the exact hardware set up of the system, including other components that may contribute towards the energy requirement of a particular system component. Furthermore, considering the historical energy consumption, it is possible to also take into account differences in system component that may result as a consequence of manufacturing imperfections.

In some embodiments, the plurality of heterogeneous energy stores comprise: a first energy store; and a second energy store; and the first energy store and the second energy store have different energy characteristics. Since the first energy store and the second energy store have different energy characteristics (e.g. energy profiles), for some activities of the system component it may be desirable to provide energy from one of the first and second energy stores rather from the other. Additionally, by virtue of the first energy store and the second energy store having different energy characteristics, it may be desirable to cause the system components to act differently depending on the state or condition of the first energy store and the second energy store and also the energy requirement of the system component.

There are a number of ways in which the energy characteristics of the first energy store and the second energy store may differ. In some embodiments, the first energy store is more efficient than the second energy store for a given current to be provided. For example, for a given expenditure of energy within each of the two energy stores, the first energy store may provide a higher output than the second energy store. In some embodiments, the first energy store has a higher specific power delivery than the second energy store. For example, the first energy store may be more capable of providing a higher power than the second energy store. A higher specific power delivery may be suitable where a large burst in power is required.

In some embodiments, the first energy store has a smaller specific energy storage than the second energy store. For example, the first energy store may be capable of storing less energy than the second energy store. Hence, the first energy store may become depleted more quickly than the second energy store assuming that the same quantity of energy is demanded from both the first energy store and the second energy store.

The energy stores may take a number of different forms. In some embodiments, the first energy store comprises a capacitor; and the second energy store comprises a battery.

Chemically based charged storage devices (such as lithium-ion batteries) have a non-linear behaviour with respect to their output current. In particular, as the current drawn from such a battery increases, the efficiency of the device, as well as its lifetime, decreases. As the current drawn from a battery increases, the energy stored within the battery decreases non-linearly with respect to the energy output from the battery. Capacitors (including so-called ultra-capacitors) are energy storage devices that hold comparatively high amounts of energy and can also quickly release that energy in a burst of power. Typically, a capacitor has a smaller specific energy (storage) than a battery, but a higher specific power (delivery) than a battery. Accordingly, a capacitor may be better suited to providing a large amount of energy for a short period and accordingly can enable a high current to be drawn at high efficiency, albeit for a small period of time until the capacitor is discharged. In contrast, a battery may be better suited to providing a low amount of energy for an extended period of time. If a processor wishes to execute at a higher clock frequency than usual, this may require an increase in energy consumption. Such an increase in energy consumption may be denied if the capacitor is not charged at that time since otherwise this would cause a large amount of energy to be requested from the battery, which may be less efficient.

There are a number of ways in which the status determination unit may determine the status information. However, in some embodiments, this is achieved based on a status report from at least one of the plurality of heterogeneous energy stores. For example, at least one of the plurality of heterogeneous energy stores may send a report (either solicited or unsolicited) to the apparatus and the status determination unit may use this information in order to determine the status information of that energy store.

Such a report may take a number of different formats. In some embodiments, the status report comprises at least one of: a charge, a temperature, a drawn current, time since last charge, a charge over time, a temperature over time, a drawn current over time, a maximum charge and a maximum current of at least one of the plurality of heterogeneous energy stores. It would be appreciated that other information may be used in order to determine status information relating to an energy store.

In some embodiments, the status determination unit determines the status information based on historical information regarding the plurality of heterogeneous energy stores. Accordingly, the status determination unit may be able to determine the status of an energy store based on a pattern of use. For example, it may be possible to determine, from historical information, that after a system component continuously operates for a period of time, the amount of energy remaining in the energy store that supplies that system component will have decreased by a particular amount (on average). By basing the status information on historical information, it may be possible to determine status information relating to an energy store without actively querying that energy store and without the energy store actively providing any data.

In some embodiments, the system control unit is further configured to control a transfer of energy from the plurality of heterogeneous energy stores to the system component. For example, the system control unit may prevent the flow of energy from a particular energy store or else may cause the energy stores to contribute energy in a particular manner. The system control unit may, for example, control a proportion of energy transferred by each of the plurality of heterogeneous energy stores to the system component. By controlling the contribution provided by each of the plurality of heterogeneous energy stores to the system component, it may be possible to encourage or discourage particular energy stores from being used. This may be particularly useful keeping in mind the specific energy of an energy store. For example, some energy stores may be efficient when particular currents are drawn. Hence, the energy transferred by each energy store could be divided such that each of the energy stores could be providing energy at its peak rate of efficiency.

There are a number of ways in which the system control unit may control the activity of the system component. In some embodiments, the system control unit controls activity of the system component by indicating in which of the plurality of modes the system component is to operate. Hence, the system control unit may control activity of a system component by encouraging, forcing or prohibiting the system component from operating in a particular mode. If the modes have different energy requirements then this operation may affect the energy required by the system component.

The system control unit may control activity of the system component by deferring at least some activity of the system component. In some cases, it may be appropriate to defer an activity of the system component until one or more of the heterogeneous energy stores is in a suitable state for the activity to take place. For example, where one of the energy stores is a capacitor, if the system component desires to perform an activity that is particularly energy intensive, but will only last a short period of time, then it may be appropriate to wait for the capacitor to be fully charged before the system component engages in that activity so that the capacitor may be used to power the system component. This may be especially useful where the other energy store is a battery, which may perform less efficiently when a large amount of energy is drawn in a short period of time.

The system control unit may control activity of the system component on further dependence on a temperature of the system component or one of the plurality of heterogeneous energy stores. Temperature can play a role on both the efficiency of components and also the efficiency of energy stores. Hence, the system control unit may consider the temperature of the system component or one of the heterogeneous energy stores in determining how the activity of the system component is to be controlled.

The system control unit may control activity of the system component for a number of different purposes. In some embodiments, the system control unit controls the activity of the system component such that a current drawn from at least one of the plurality of heterogeneous energy stores remains below a first threshold value. The first threshold value may, for example, be a value above which the efficiency of the energy store drops below a particular level. It may therefore be desirable to ensure that the current drawn from the energy store remains below this first threshold value, such that the efficiency of the energy store remains high.

In some embodiments, the system control unit controls activity of the system component such that a total energy provided by the plurality of heterogeneous energy stores remains at or above a second threshold value. This second threshold value may represent the amount of energy necessary for the system component to perform a particular task. This may be useful in order to ensure that a particular energy reserve is kept in the system, which may be appropriate if one of the energy stores is an energy harvester that relies on environmental conditions in order to capture usable energy.

In some embodiments the system control unit controls activity to the system component such that an efficiency of at least one of the plurality of heterogeneous energy stores remains above a third threshold value. The efficiency of an energy store may be defined in a number of different ways. However, in some embodiments, the efficiency may be measured as energy output divided by energy input. For example, the amount of energy provided from the energy store divided by the amount of energy consumed in the energy store.

In some embodiments, the system control unit controls activity of the system component in dependence on a charge of at least one of the plurality of heterogeneous energy stores. An example of an energy store is an ambient harvester. For example, such an energy store may acquire energy from the local environment via, for example, solar energy, vibrational energy, kinetic energy, thermo energy, etc. Such energy stores may acquire energy over an extended period of time. Accordingly, it may take a period of time for the charge of such an energy store to build up. Hence, the system control unit may control activity of the system components depending on what that charge is and may also control activity of the system components based on the current environmental conditions or recharging rate of an ambient harvester.

In some embodiments, the system component comprises a first processing device and a second processing device, wherein an energy requirement of the first processing device is greater than an energy requirement of the second processing device, and a processing capability of the first processing device is greater than a processing capability of the second processing device; the system control unit is to select a selected one of the first processing device and the second processing device to execute at least one instruction, and to cause one of the plurality of heterogeneous energy stores to supply power to the selected one of the first processing device and second processing device based on the plurality of energy stores and the energy requirements of the first processing device and the second processing device and an energy profile of the plurality of heterogeneous energy stores. In such embodiments, the at least one instruction may be executed by the first processing device or the second processing device. The first processing device has a greater processing capability than the second processing device and hence, in some embodiments, the first processing device may be able to execute at least one instruction more quickly than the second processing device. However, the first processing device has a greater energy requirement than the second processing device and hence such greater processing capability comes at the cost of increased energy requirements. Hence, the selection of the first processing device or the second processing device for the execution of the at least one instruction, may be based on the plurality of energy stores, the energy requirements of the processing devices, and/or the energy profile of the plurality of heterogeneous energy stores. In some cases, the first processing device (with the greater processing capability) is selected provided that one of the heterogeneous energy stores is capable of providing the necessary energy in an efficient manner. Otherwise, the second processing device (having the lower processing capability) may be used instead.

In some embodiments, the system component comprises a plurality of heterogeneous processing units; and the system control unit controls the activity of the system component by controlling scheduling of tasks to be executed by one or more of the heterogeneous processing units.

In some embodiments, the system component comprises a processing device in response to the processing device indicating that a higher processing speed is desired, the system control unit causes energy to be supplied by a one of the plurality of heterogeneous energy stores having a higher specific power delivery than another. Higher processing speed may be linked to an increase of energy consumption. Accordingly, if the processing device indicates that the higher processing speed is desired, this may be expected to be accompanied by an increase in energy consumption. Hence, in such embodiments, the system control unit causes the energy to be supplied by whichever of the plurality of heterogeneous energy stores that has a higher specific power delivery than another. In some embodiments, this may be the energy store that has the highest specific power delivery among all others. Accordingly, the increased energy requirement is dealt with by an energy store that is better suited to providing large quantities of energy, such as a capacitor, rather than a battery. Accordingly, the higher processing speed is enabled in such a manner that the overall energy efficiency of the system is kept high.

Note that although the term "energy requirement" is used throughout this specification, it is not necessary that the requirement is represented as a quantity of energy (e.g. measured in joules). In some embodiments, the energy requirement may be represented by at least one of: a quantity of energy, a quantity of power, or a quantity of current. A quantity of power may be represented as, for example, a number of watts and a quantity of current may be represented as, for example, a number of amperes. Other ways of representing an amount of energy may also be used to represent the energy requirement.

Particular embodiments will now be described with reference to the figures.

FIG. 1 illustrates a system 100 comprising an energy manager 110. In the embodiment shown in FIG. 1, the energy manager 110 receives mode requests from system components 120 and status information from a battery 130 and a capacitor 140. The battery 130 and capacitor 140 are examples of heterogeneous energy stores. The energy characteristics (or energy profiles) of these two devices are different. For example, when providing a predetermined current, the capacitor 140 is more efficient than the battery 130. Furthermore, the capacitor 140 has a higher specific power delivery and a smaller specific energy storage than the battery 130. In other words, the battery 130 is capable of storing a larger quantity of energy. However, the capacitor 140 is better suited, and more efficient, at providing a short, high burst of energy (until the capacitor 140 runs out). In this embodiment, the capacitor 140 is charged by the battery 130. In some embodiments, the capacitor 140 and the battery 130 may be coupled such that energy is always provided directly from the capacitor, which may result in the capacitor 140 acting as a peak-power filter. In this embodiment, both the battery 130 and the capacitor 140 provide an energy supply to the energy manager 110 independently, which in turn forwards this energy supply to the system components 120.

The mode requests issued by the system components 120 to the energy manager 110 make it possible for an energy requirement of the system components 120 to be determined. In particular, the mode requests issued by the system components 120 comprise a specific desired energy amount. For example, one of the system components 120 may issue a mode request requesting 1 W of power. Alternatively, the mode request may specify a number of joules of energy (500 J) or may specify an amount of current (1 A). This may also be accompanied by a hint or indication as to how long the requested energy (or power or current) is required for. For example, the indication may be one of "sporadic", "background", or "continuous".

In other embodiments, the system components 120 may be capable of operating in a plurality of modes, with at least one mode having a greater energy requirement than another. The mode request issued by the system component 120 to the energy manager 110 may indicate which of the modes the system component 120 wishes to enter. The energy manager 110 may then use knowledge of the system component 120 together with its knowledge of different operating modes in order to determine the quantity of energy that will be required if the system component 120 is to enter that mode. Such a mode request may comprise a desired activity to be performed by the system component 120. Again the energy manager 110 may use knowledge of the specific system component 120, together with knowledge of the desired activity in order to determine an energy requirement for the system component 120 to perform that task.

Each of the battery 130 and the capacitor 140 provides status information to the energy manager 110. The status information may take a variety of different forms. However, the status information issued by one of the energy sources provides information relating to that energy source. The energy manager 110 uses the status information provided by the energy sources 130, 140 and the energy requirement determined from the mode requests issued by the system component 120 in order to control an activity of the system component 120.

Based on both the mode requests and the status information, the energy manager 110 controls the activity of the system components 120. This control may take place in a number of ways, some examples of which will be discussed later.

Figure 2:
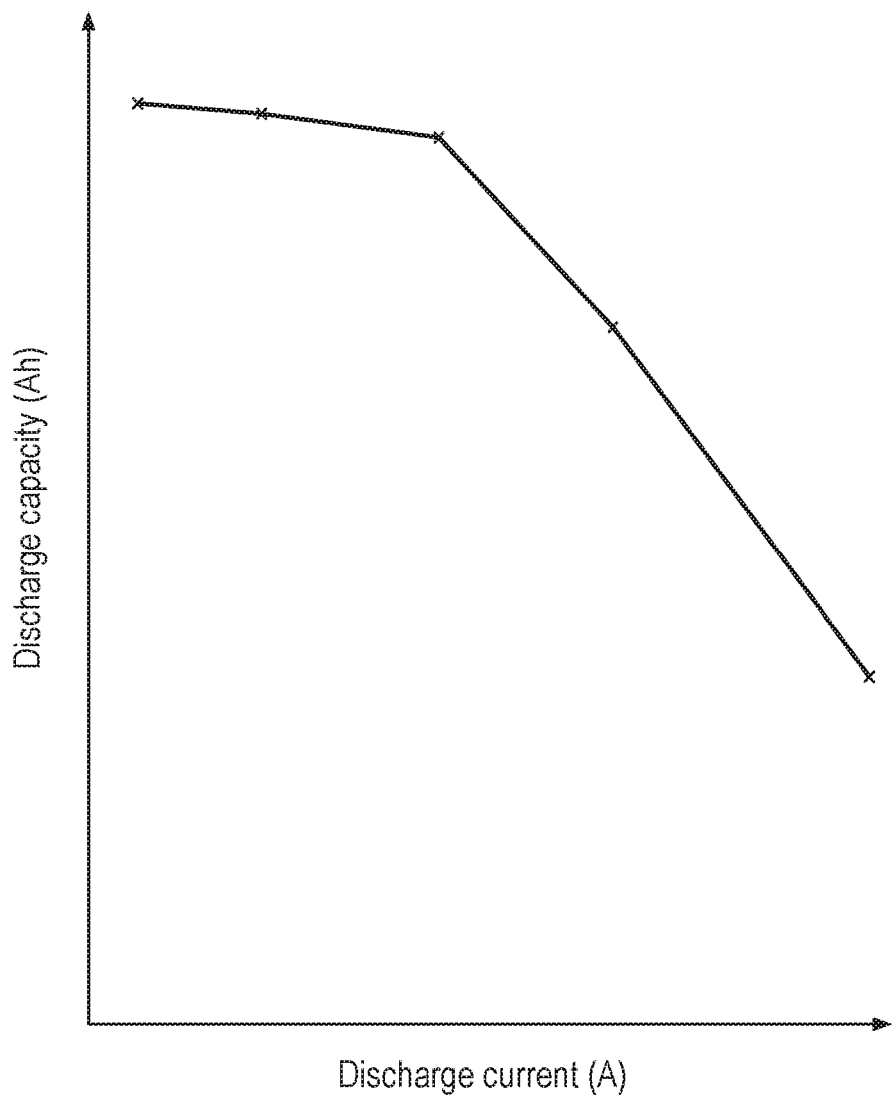
FIG. 2 is a graph illustrating the relationship between efficiency and current drawn for a typical chemically based energy store.

FIG. 2 is a graph illustrating the discharge capacity of a battery versus the discharge current provided by that battery. As can be seen in FIG. 2, as the discharge current from the battery increases, the discharge capacity decreases. In other words, as the current drawn from the battery increases, the amount of useful energy acquired from the battery decreases as compared to the energy consumed within the battery (for example, the performance or the efficiency of the battery decreases). This illustrates that for certain types of battery, it is generally preferable to draw a low current. In contrast, a capacitor works more efficiently than a battery when a large current is drawn. Hence, it may be preferable to draw high current from a capacitor rather than from a battery.

Figure 3:
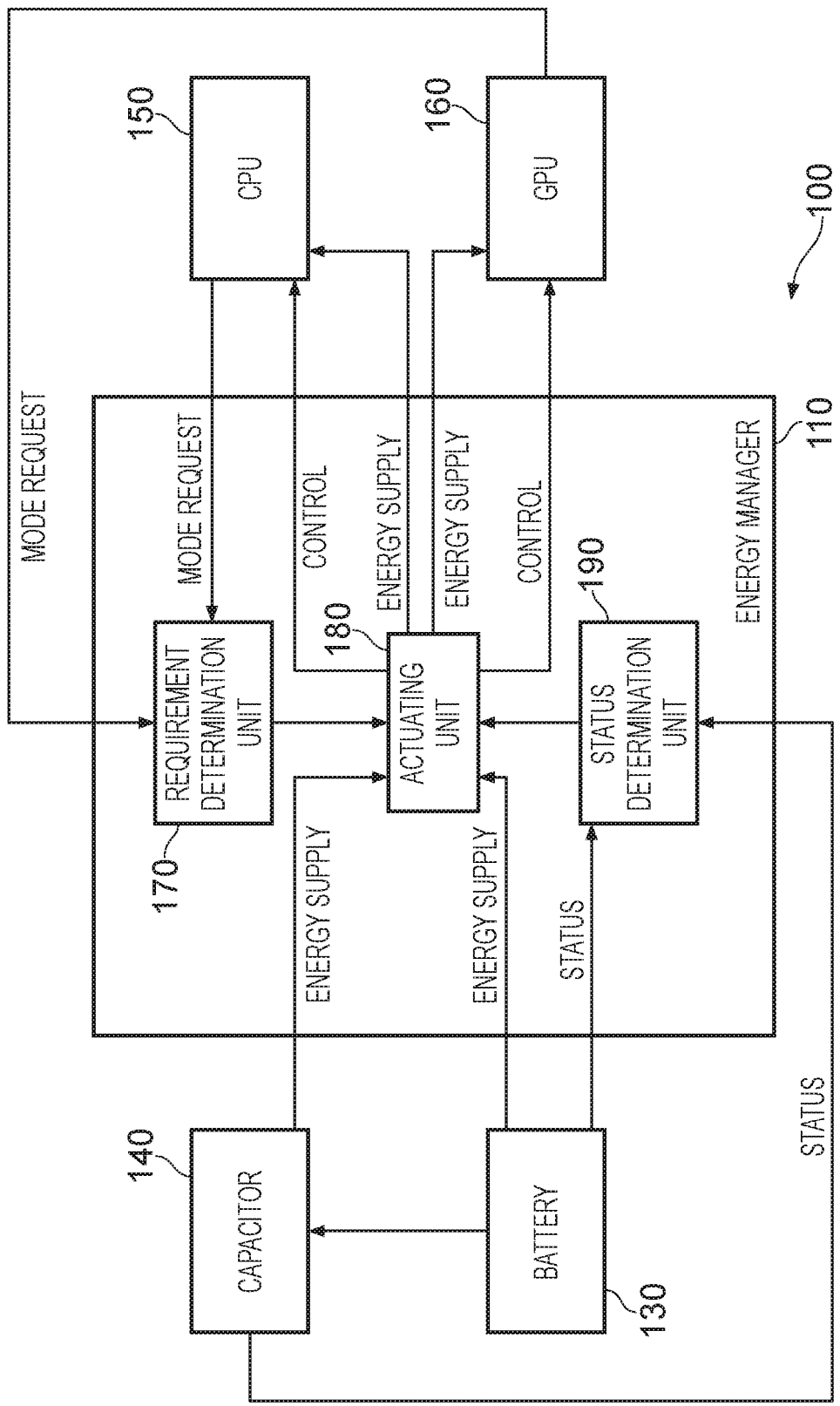
FIG. 3 illustrates, schematically, a system implementing an energy manager in accordance with one embodiment.

FIG. 3 illustrates a system 100 comprising an energy manger 110 in accordance with one embodiment. In this embodiment, the system components 120 comprise a Central Processing Unit (CPU) 150 and a Graphics Processing Unit (GPU) 160. Each of these components issue mode requests to the energy manager 110, which are received by a requirement determination unit 170. The requirement determination unit 170 provides this information to an actuating unit 180 (which is an example of a system control unit). Each of the battery 130 and the capacitor 140 provides status information to a status determination unit 190. The status determination unit 190 uses this information to determine the current status of each of the capacitor 140 and the battery 130. Such status information may include for example: a charge, a temperature, a drawn current, the time since the energy source was last charged, a charge over time, a temperature over time, a drawn current over time, a maximum charge, and a maximum current of that energy source. The status determination unit 190 may determine the status information relating to one of the energy sources 130, 140 by using historical information relating to those energy sources. For example, if the charge of battery 130 was previously determined to be dropping by a particular quantity every minute, then this historical information may be used in order to determine the current of the battery 130 at a given time. The status information acquired by the status determination is 190 is provided to the actuating unit 180. In addition, the actuating unit 180 receives the energy supply from the battery 130 and the capacitor 140.

There are a number of ways in which the actuating unit 180 may control the activity of the CPU 150 and the GPU 160 based on a mode request issued by one of those devices and based on the status information acquired from the battery 130 and the capacitor 140. For example, in this embodiment if the CPU 150 indicates that it wishes to "sprint" (e.g. run at a higher clock speed for a short period of time) then this may be indicated in a mode request sent by the CPU 150 to the requirement determination unit 170. The actuating unit 180 may respond to this information by considering the status information of the capacitor 140 and the battery 130. If a large current is already being drawn by the battery 130, then it would be undesirable for the battery to provide the additional requested energy, since this would increase the inefficiency at which the battery 130 is operating. However, if the actuating unit is aware that the capacitor 140 is fully charged, then the actuating unit 180 may cause the additional required energy to be supplied by the capacitor 140. As previously explained, the capacitor 140 is more efficient at providing a high current for a short period of time. If, however, the actuating unit 180 determines from the status information provided from the status determination unit 190 that the capacitor 140 is not currently charged, then the actuating unit 180 may defer the request issued by the CPU 150. In other words, the CPU 150 will not be permitted to run at a higher clock speed yet. However, it may be able to do so after a short period of time has elapsed, such as once the capacitor 140 has charged.

As a further example, the GPU 160 may be capable of operating at a variety of different resolutions (an example of different operating modes). Each of the resolutions at which the GPU 160 operates may consume a different quantity of energy, with some modes requiring more energy than other modes. If the GPU 160 transmits a mode request for the requirement determination unit 170 and the energy manager 110 indicating a desire to operate at a different mode of operation, then the actuating unit 180 may again determine, based on the request and based on status information provided by the status determination unit 190 regarding the battery 130 and the capacitor 140, how to control the activity of the GPU 160. Based on the determination, the actuating unit 180 may indicate at which of the operating modes (or resolutions) the GPU 160 is permitted to operate. For example, if the current being drawn by the battery 130 is low, then the actuating unit 180 may indicate that the GPU 160 is permitted to operate at a resolution that will cause a large amount of energy to be consumed.

Alternatively, if the current being drawn by the battery 130 is high, but the capacitor 140 is fully charged, then the actuating unit 180 may allow the GPU 160 to operate at a mode that consumes additional energy. In other embodiments, the actuating unit 180 may react by throttling the CPU 150, thereby decreasing the energy consumed by the CPU 150 and allowing the energy consumed by the GPU 160 to increase, without affecting the total energy consumption of the two components 150 and 160.

It will be appreciated that there are other factors that may be taken into account by the actuating unit 180 when controlling the activity of the system components 150, 160. For example, the actuating unit 180 may also consider a temperature of one of the system component 150, 160 or a temperature of one of the energy stores 130, 140. In particular, if the temperature of one of these elements is particularly high, then the actuating unit 180 may determine that the devices are likely to operate less efficiently and so may therefore deny requests for energy consumption to increase.

In some embodiments, the energy stores comprise an ambient harvester such as a solar cell. In such embodiments, the actuating unit may control activity of the system component based on the current environmental conditions or the current charge rate of the ambient harvester. For example, such a decision may depend on whether the ambient harvester will be able to replenish its energy supply if that energy supply is consumed.

The combination of a plurality of CPUs 150 may be present in a so-called big/little system. In such systems, a plurality of heterogeneous processing devices is provided. At least one of the devices has a smaller energy requirement than other devices but also has a smaller processing capability than other devices. Accordingly, it is possible to select one of the plurality of the processing devices to execute an instruction. Meanwhile, if the other processing devices can be deactivated than it may be possible to achieve an energy saving. In some embodiments, the actuating unit may select one of the processing devices to execute an instruction. For example, if the current being drawn from the battery 130 is high, then a processing device that consumes a smaller quantity of energy may be selected for the execution of an instruction. Alternatively, if the current being drawn by the battery 130 is high, but the capacitor 140 is fully charged, then the actuating unit 180 may allow the selection of a processing device that consumes a higher amount of energy as compared to other processing devices.

In some embodiments, the actuating unit may control activity of the system component by controlling the scheduling of tasks that are to be executed by one or more processing units. For example, the running of tasks or system components requiring high energy consumption may be spread out or distributed such that they do not all run at once. Accordingly, the energy consumption of the set of system components as a whole may be normalised, reducing high current draw, which may be inefficient for some energy stores such as batteries.

The actuating unit 180 may control activity of the system components 150, 160 for a number of different purposes. For example, as has already been explained, the battery 130 operates more efficiently as a consequence of the current being drawn from the battery being below a particular threshold. Accordingly, the actuating unit 180 may control activity of the system components 150, 160 in such a way that the current is drawn from the battery remains below that threshold. Similarly, the activity of the system components 150, 160 may be controlled such that the energy stores 130, 140 produce a total energy below a particular threshold value. In some cases, the activity of the system components 150, 160 may be controlled such that the overall efficiency of at least one of the energy stores 130, 140 remains above a particular threshold.

Figure 4:
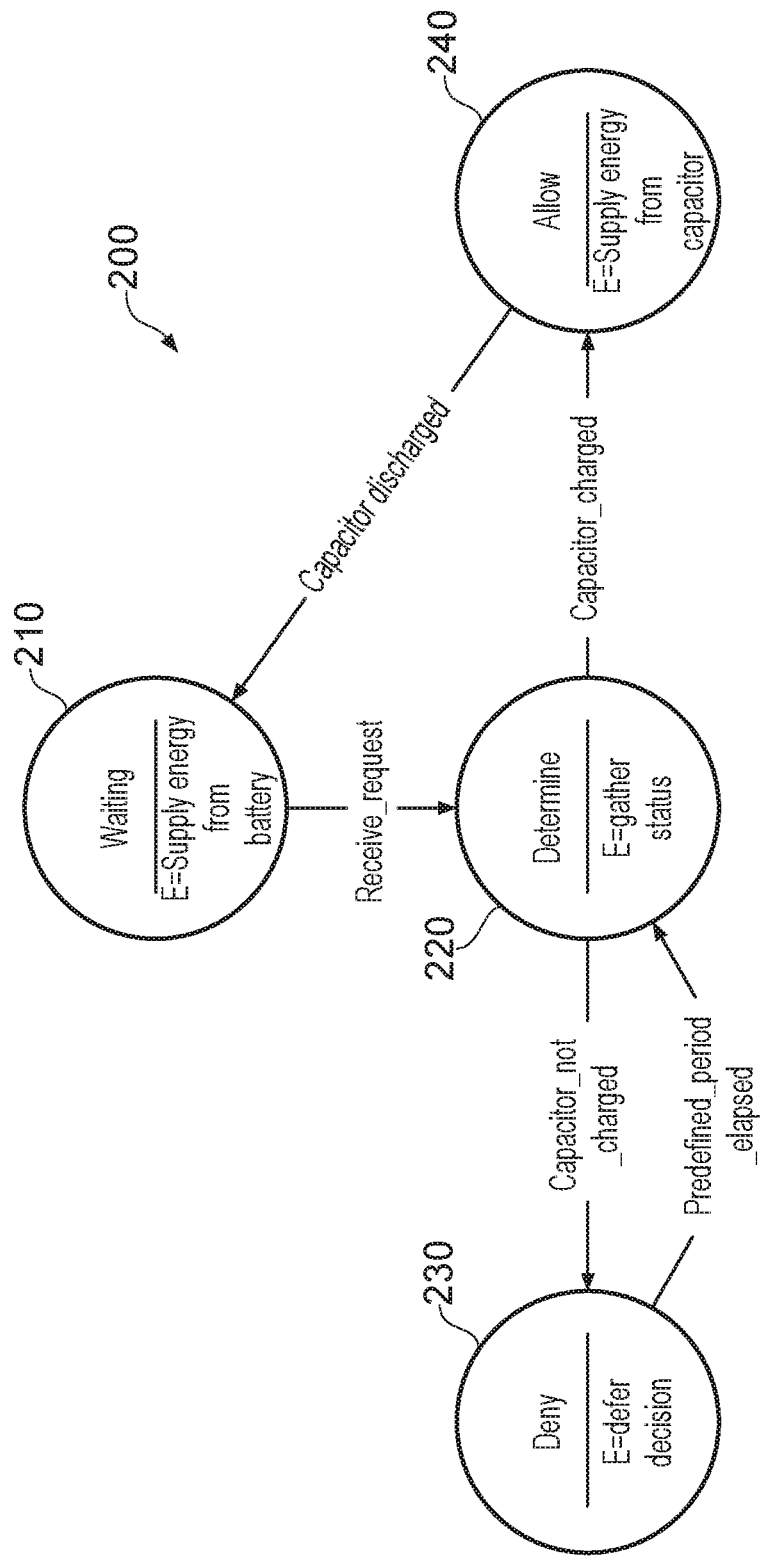
FIG. 4 illustrates a finite state machine representing a series of states and transactions involved in a request from a system component for an increase in energy in accordance with one embodiment.

FIG. 4 illustrates a finite state machine in accordance with one embodiment. In a Waiting state 210, the energy manager waits to receive a request from one of the system components 120. In this embodiment, the request relates to sprinting, e.g. the request indicates that a processing unit wishes to run at a higher clock speed than usual for a short period of time. Whilst the system is in the Waiting state, the energy manager supplies energy to the system component 120 from the battery 130.

In response to receiving the request from one of the system components 120, the energy manager 110 enters a Determine state 220. At this point, the energy manager gathers a status from each of the energy sources 130, 140. If it is determined that a capacitor 140 is not charged, then the system enters a Deny state 230, in which the decision to grant the request from the system component 120 is deferred. After a predefined period of time has lapsed, the system re-enters the Determine state 220.

If, whilst in the Determine, state 220, the capacitor is charged, then the system enters the Allow state 240. In this state, the request from the system component 120 is allowed and energy is supplied from the capacitor 140. This will continue until the capacitor is discharged, at which point the system re-enters the Waiting state 210. On entering the Waiting state, the battery may continue to provide the requested energy, or the system component 120 may be controlled to return to its previous (e.g. non-sprint) state, such that the energy consumption lowers.

Figure 5:
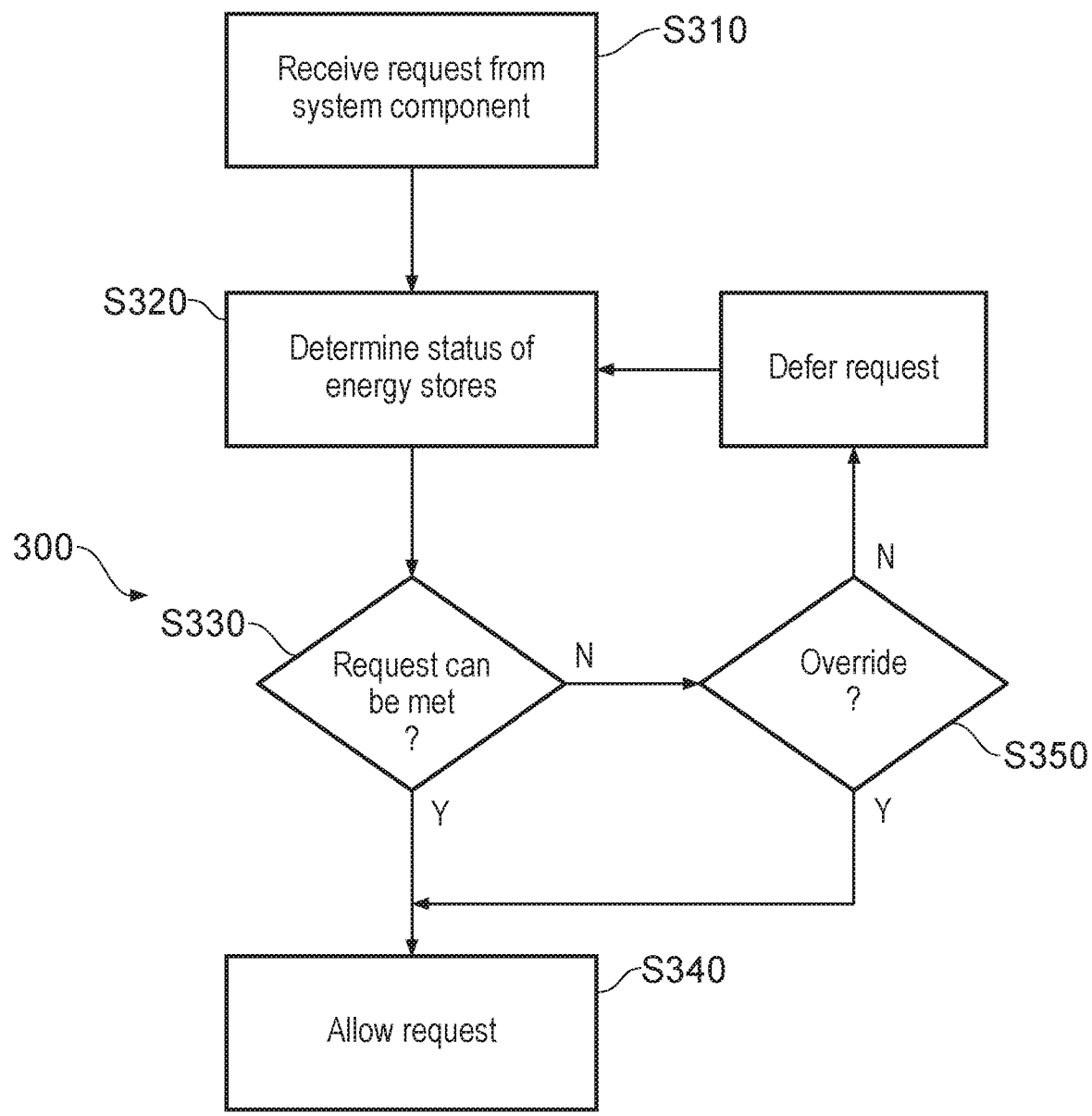
FIG. 5 is a flow chart illustrating a method of responding to an energy request from a system component in accordance with one embodiment.

FIG. 5 illustrates a flow chart 300 in accordance with one embodiment.

At step S310, the energy manager 110 receives a request from one of the system components 120 to enter a new mode of operation. The energy manager 110 then determines the status of each of the energy stores 130, 140 at step S320. This may be achieved by issuing a status information packet from each of the energy sources 130, 140 to, for example, a status determination unit 190 in the energy manager 110. In other embodiments, the energy manager 110 may have a further way of determining the status of each of the energy sources 130, 140. For example, the energy manager 110 may consider historical information relating to the energy sources 130, 140 and/or previous unsolicited status information may be used.

In any event, at step S330, it is determined whether or not the request that was received from one of the system components 150, 160 should be allowed. The energy manager 110 makes this determination based on both the request itself and the current status information of each of the energy sources 130, 140. In particular, the energy manager 110 may seek to ensure that efficiency of the energy sources 130, 140 remained above some threshold. If the request can be met, for example if the energy sources 130, 140 will be capable of supplying the requested energy at a suitable efficiency, then the request is allowed at step S340. The allowance of the request may cause the distribution of energy provided from each of the battery 130 and the capacitor 140 to be altered. In particular, this may cause the capacitor 140 to supply energy, whereas previously it hadn't. The system components 150, 160 may also be controlled to enter the new (requested) mode of operation. Alternatively, in some embodiments, this may cause other of the system components 120 to be controlled in a manner such that their energy consumption changes. All of these processes may be carried out, for example, by the actuating unit 180.

If, at step S330, it is determined that the request cannot be met, then at step S350, it is determined whether or not the decision reached by the energy manager 110 is to be overridden. For example, if the CPU 150 has an urgent task to perform, then it may send a request for its clock speed to be increased. However, if this request cannot be met, for example if the battery is already providing a high current and if the capacitor 140 is already discharged, then the request may initially be rejected or deferred. However, if the task is safety critical, for example, this decision may be overridden and the energy manager 110 may be forced to provide the requested energy and to permit the CPU 150 to run at the higher clock speed. In this case, the process proceeds to step S340, where the necessary control is performed by the energy manager 110. In the alternative, the request is deferred and the process returns to step S320 where the status of each of the energy stores 130, 140 is determined once more.

Figure 6:
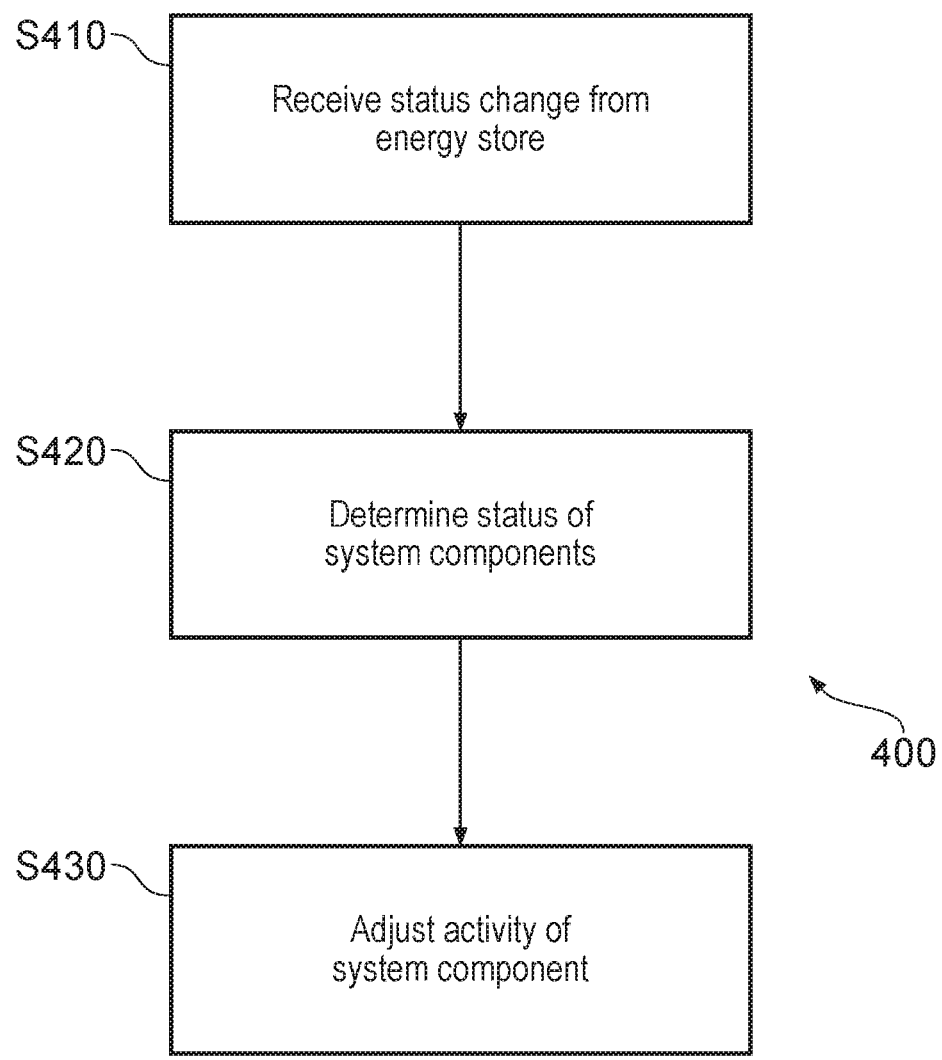
FIG. 6 is a flow chart illustrating a method of responding to a status change from an energy store in accordance with one embodiment.

FIG. 6 provides a flow chart 400 illustrating a method in accordance with one embodiment.

At step S410, a status change is received from one of the energy stores 130, 140. At step S420, it is determined what the status of each of the system components 120 is. At step S430, activity of the system components 120 is adjusted based on both the status of the system components and the status change of the energy store. In this embodiment, the acquisition of information is reversed. In particular, updates from the energy stores 130, 140 are sent periodically to the energy manager 110 and the energy manager 110 actively determines the status of the system components 120 in order to make decisions as to whether the activity of the system components 120 must be adjusted.

Hence it can be seen that the presently described techniques make it possible to control system components based on information relating to a number of different (heterogeneous) energy stores In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    requirement determination circuitry to determine an energy requirement for a system component circuitry;
    status determination circuitry to determine status information relating to a plurality of heterogeneous energy stores including a capacitor and a further energy store, each configured to provide power to the system component circuitry; and
    system control circuitry to control an activity of the system component circuitry in dependence on the status information relating to the plurality of heterogeneous energy stores and the energy requirement by deferring, when the further energy store is charged enough for the activity to take place, at least some of the activity of the system component circuitry until the capacitor is charged enough for the activity to take place.

2. An apparatus according to claim 1, further comprising:
    request receiving circuitry to receive a request from the system component circuitry; and
    the requirement determination circuitry is capable of determining the energy requirement for the system component circuitry based on the request.

3. An apparatus according to claim 2, wherein the request comprises a desired energy amount.

4. An apparatus according to claim 2, wherein the system component circuitry is capable of operating at a plurality of modes, at least one mode having greater energy requirement than another; and the request is indicative of a desired one of the plurality of modes.

5. An apparatus according to claim 2, wherein the request comprises a desired activity to be performed.

6. An apparatus according to claim 1, wherein the requirement determination circuitry determines the energy requirement for the system component circuitry based on historical energy consumption of the system component circuitry.

7. An apparatus according to claim 1, wherein the plurality of heterogeneous energy stores comprise:
 a first energy store; and
 a second energy store; and
the first energy store and the second energy store have different energy characteristics.

8. An apparatus according to claim 1, wherein for a predetermined current, the first energy store is more efficient than the second energy store.

9. An apparatus according to claim 7, wherein the first energy store has a higher specific power delivery than the second energy store.

10. An apparatus according to claim 7, wherein the first energy store has a smaller specific energy storage than the second energy store.

11. An apparatus according to claim 7, wherein the first energy store comprises the capacitor; and the second energy store comprises a battery.

12. An apparatus according to claim 1, wherein the status determination circuitry determines the status information based on a status report from at least one of the plurality of heterogeneous energy stores.

13. An apparatus according to claim 12, wherein the status report comprises at least one of: a charge, a temperature, a drawn current, time since last charge, a charge over time, a temperature over time, a drawn current over time, a maximum charge and a maximum current of at least one of the plurality of heterogeneous energy stores.

14. An apparatus according to claim 1, wherein the status determination circuitry determines the status information based on historical information regarding the plurality of heterogeneous energy stores.

15. An apparatus according to claim 1, wherein the system control circuitry is further configured to control a transfer of energy from the plurality of heterogeneous energy stores to the system component circuitry.

16. An apparatus according to claim 1, wherein the system control circuitry is further configured to control a proportion of energy transferred by each of the plurality of heterogeneous energy stores to the system component circuitry.

17. An apparatus according to claim 4 wherein the system control circuitry controls activity of the system component circuitry by indicating in which of the plurality of modes the system component circuitry is to operate.

18. An apparatus according to claim 1, wherein the system control circuitry controls activity of the system component circuitry on further dependence on a temperature of the system component circuitry or one of the plurality of heterogeneous energy stores.

19. An apparatus according to claim 1, wherein the system control circuitry controls activity of the system component circuitry such that a current drawn from at least one of the plurality of heterogeneous energy stores remains below a first threshold value.

20. An apparatus according to claim 1, wherein the system control circuitry controls activity of the system component circuitry such that a total energy provided by the plurality of heterogeneous energy stores remains at or above a second threshold value.

21. An apparatus according to claim 1, wherein the system control circuitry controls activity of the system component circuitry such that an efficiency of at least one of the plurality of heterogeneous energy stores remains above a third threshold value.

22. An apparatus according to claim 1, wherein the system control circuitry controls activity of the system component circuitry in dependence on a charge of at least one of the plurality of heterogeneous energy stores.

23. An apparatus according to claim 1, wherein the system component circuitry comprises a first processing device and a second processing device, wherein an energy requirement of the first processing device is greater than an energy requirement of the second processing device, and a processing capability of the first processing device is greater than a processing capability of the second processing device;
the system control circuitry is to select a selected one of the first processing device and the second processing device to execute at least one instruction, and to cause one of the plurality of heterogeneous energy stores to supply power to the selected one of the first processing device and second processing device based on the plurality of energy stores and the energy requirements of the first processing device and the second processing device and an energy profile of the plurality of heterogeneous energy stores.

24. An apparatus according to claim 1, wherein the system component circuitry comprises a plurality of heterogeneous processing circuitry; and the system control circuitry controls the activity of the system component circuitry by controlling scheduling of tasks to be executed by one or more of the heterogeneous processing circuitry.

25. An apparatus according to claim 1, wherein the system component circuitry comprises a processing device; and
in response to the processing device indicating that a higher processing speed is desired, the system control circuitry causes energy to be supplied by a one of the plurality of heterogeneous energy stores having a higher specific power delivery than another.

26. An apparatus according to claim 1, wherein the energy requirement is represented by at least one of: a quantity of energy, a quantity of power, or a quantity of current.

27. A method comprising the steps:
determining an energy requirement for a system component circuitry;
determining status information relating to a plurality of heterogeneous energy stores including a capacitor and a further energy store, each configured to provide power to the system component circuitry; and controlling an activity of the system component circuitry in dependence on the status information relating to the plurality of heterogeneous energy stores and the energy requirement, by deferring, when the further energy store is charged enough for the activity to take place, at least some of the activity of the system component circuitry until the capacitor is charged enough for the activity to take place.

28. An apparatus comprising:

means for determining an energy requirement for a system component circuitry;

means for determining status information relating to a plurality of heterogeneous energy stores, including a capacitor and a further energy store, each configured to provide power to the system component circuitry; and means for controlling an activity of the system component circuitry in dependence on the status information relating to the plurality of heterogeneous energy stores and the energy requirement, by deferring, when the further energy store is charged enough for the activity to take place, at least some of the activity of the system component circuitry until the capacitor is charged enough for the activity to take place.

\* \* \* \* \*